Nov. 4, 1930.                C. C. SPREEN                1,780,248
                           JOURNAL BEARING SEAL
                           Filed Dec. 30, 1926
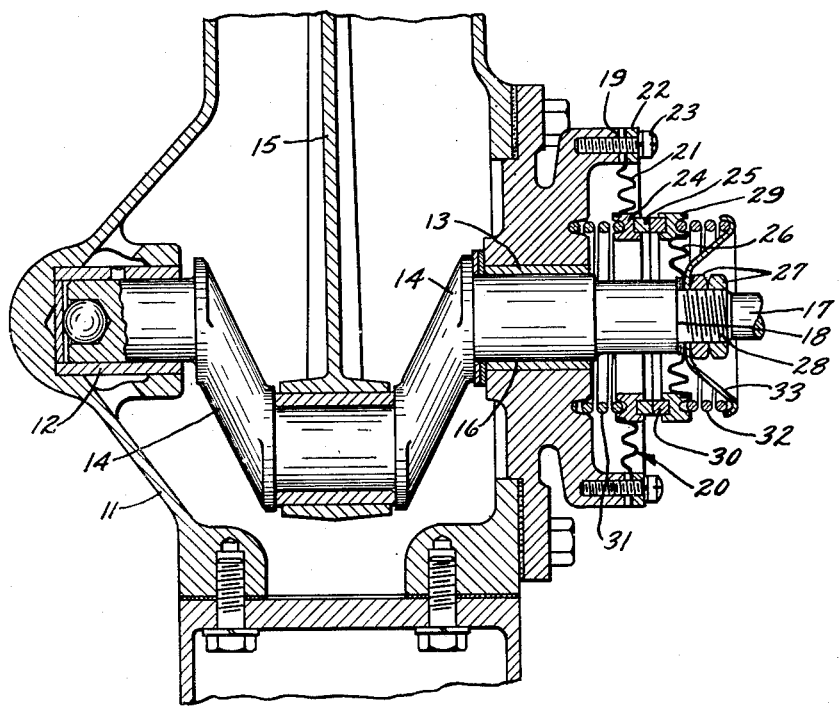
CHARLES C. SPREEN
Inventor
By Smith and Freeman
Attorneys Patented Nov. 4, 1930

1,780,248

UNITED STATES PATENT OFFICE

CHARLES C. SPREEN, OF DETROIT, MICHIGAN

JOURNAL-BEARING SEAL

Application filed December 30, 1926. Serial No. 157,939.

My invention relates to seals for journal bearings, and particularly to means for sealing the drive shaft aperture in the casing of a refrigerant compressor, and the principal object of my invention is to provide new and improved means for this purpose. In the drawing accompanying this specification and forming a part of this application I have shown, for purposes of illustration, one form which my invention may assume, and in this drawing the single figure is a fragmentary central vertical section through a compressor showing the embodiment of my invention herein disclosed.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15. The crank shaft projects beyond the open-end bearing 13 through a suitable aperture 16 in the casing 11, and is provided exteriorly of the casing 11 with a reduced extension 17 forming an annular shoulder 18 and adapted to receive a suitable driving connection, not shown; and the casing 11 is provided with an annular casing seat 19 surrounding the aperture 16 and crank shaft 14 passing therethrough.

Closing the aperture 16, particularly to prevent both the egress of refrigerant and the ingress of moisture, is a seal 20 herein shown as comprising a first generally radial flexible annular diaphragm 21 corrugated to increase its flexibility, fixedly sealed at its periphery to the casing seat 19 by means of an annular securing ring 22 secured to the casing seat 19 by means of securing screws 23 clamping the securing ring 22 to the casing seat 19 with the periphery of the diaphragm 21 sealed therebetween, and attached at its inner edge to a base 24 carrying a soft metal engaging ring 25; a second substantially radial flexible annular diaphragm 26 corrugated to increase its flexibilty, fixedly sealed at its inner edge to the crank shaft 14 by means of nuts 27 engaging a screw-threaded section 28 formed on the reduced extension 17 and clamping the inner edge of the diaphragm 26 firmly against the shoulder 18, and attached at its periphery to a base 29 carrying an engaging ring 30 positioned to engage the engaging ring 25 carried by the base 24 attached to the first diaphragm 21; a compression spring 31 disposed between the casing 11 and the base 24 urging the base 24 outwardly against the base 29, and a compression spring 32 disposed between the base 29 and a spider 33 clamped to the shaft 14 with the inner edge of the diaphragm 26 and urging the base 29 into engagement with the base 24.

From the above description it will be obvious to those skilled in the art that I have provided a seal sealing the crank shaft aperture 16 in the casing 11 by a rotary engagement between two parts each free and floating, and under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

The combination with a casing having an annular portion projecting from one wall thereof forming a seat, and a rotatable shaft extending through said casing wall and interiorly of the annular projecting portion; of a seal structure comprising an annular sealing ring disposed radially inwardly of the aforesaid seat, a flexible diaphragm secured rigidly to the seat and sealing ring, another sealing ring disposed adjacent the first and in rotatable engagement therewith, clamping means associated with the shaft and disposed radially inwardly of said last mentioned sealing ring, a second flexible diaphragm secured rigidly to the last mentioned sealing ring and clamping means, and a pair of springs disposed concentrically of the shaft for resiliently retaining the aforesaid sealing rings in rotatable engagement.

In testimony whereof I hereunto affix my signature.

CHARLES C. SPREEN.